United States Patent [19]

Parker et al.

[11] Patent Number: 4,650,533
[45] Date of Patent: * Mar. 17, 1987

[54] PREPARATION OF HOT TRANSFER PRODUCT FOR CONTINUOUS IN-MOLD DECORATION

[75] Inventors: Harry A. Parker, Murray Hill; Joseph Greenman, Plainfield, both of N.J.

[73] Assignee: Transfer Print Foils, Inc., East Brunswick, N.J.

[*] Notice: The portion of the term of this patent subsequent to Feb. 17, 2004 has been disclaimed.

[21] Appl. No.: 674,482

[22] Filed: Nov. 23, 1984

Related U.S. Application Data

[63] Continuation of Ser. No. 401,275, Jul. 23, 1982, abandoned.

[51] Int. Cl.[4] .......................... B44C 1/16; B32B 31/00; B31F 1/00; B29C 45/00
[52] U.S. Cl. ..................... 156/219; 156/233; 156/238; 156/240; 156/257; 156/245
[58] Field of Search ............... 264/509, 257, 267, 269; 150/230, 240, 241, 360, 541, 542; 156/540, 239, 219, 196, 238, 245, 249, 257, 267, 277, 233

[56] References Cited

U.S. PATENT DOCUMENTS

| | | | |
|---|---|---|---|
| 2,391,539 | 12/1945 | Avery | 156/259 |
| 2,627,485 | 2/1953 | Smith | 156/240 |
| 3,108,850 | 10/1963 | Brandt | 264/275 |
| 3,166,186 | 1/1965 | Karn | 156/253 |
| 3,292,209 | 12/1966 | Borkmann | 425/126 R |
| 3,801,689 | 4/1974 | Langecker | 264/509 |
| 3,816,207 | 6/1974 | Robertson et al. | 156/238 |
| 3,886,020 | 5/1975 | Shank, Jr. | 156/230 |
| 4,059,471 | 11/1977 | Haigh | 264/509 |
| 4,202,663 | 5/1980 | Haigh | 8/471 |
| 4,235,657 | 11/1980 | Greenman et al. | 156/240 |
| 4,236,955 | 12/1980 | Prittie | 156/361 |
| 4,263,077 | 4/1981 | Rampelberg | 156/240 |
| 4,379,017 | 4/1983 | Bauta | 156/238 |
| 4,418,033 | 11/1983 | Hatakeyama | 264/509 |

Primary Examiner—Michael Ball
Assistant Examiner—Louis Falasco
Attorney, Agent, or Firm—David A. Jackson

[57] ABSTRACT

A method is disclosed for the preparation of a hot transfer film that is pre-cut and pre-positioned for continuous application during the forming of plastic articles by an in-mold decorating technique. A carrier film is first bonded to the transfer film from which the hot transfer is prepared, to form a releasable laminate. The laminate is then printed with appropriate decorating indicia on the free surface of the transfer film component thereof. Printing may be single-stage or multi-stage, depending upon the indicia desired, and a subsequent metalization of the transfer film surface may be performed.

The fully printed laminate is then indexed into position and die-cut under conditions controlled to assure full penetration of the transfer film by the die, without penetration of the adjacent surface of the carrier film. Thereafter, the unwanted portions of the transfer film are stripped away, leaving the pre-cut decorated transfers, positioned on the carrier film for continuous indexing into position for the in-mold decoration of the plastic article being formed.

The present method eliminates post-treatment of the decorated molded article.

26 Claims, 7 Drawing Figures

PREPARATION OF HOT TRANSFER PRODUCT FOR CONTINUOUS IN-MOLD DECORATION

This application is a continuation, of application Ser. No. 401,275, filed July 23, 1982, abandoned.

BACKGROUND OF THE INVENTION

1. Field of the Invention

The present invention relates to hot transfer materials suitable for application to three dimensional items by the technique of in-mold decoration.

2. Description of the Prior Art

The decoration of a variety of molded products, by the application of decorating indicia to the product during the molding process, i.e., the technique of in-mold decorating, is well known. Thus, such techniques are practiced by feeding into the mold in which the product is to be formed, a continuous strip having regularly spaced thereon, a plurality of identical decorating indicia. Thus, the strip would be indexed into position so that the decoration would be aligned with the intended location on the products, after which the product would be molded against the decoration and thereafter the strip would be appropriately severed and trimmed to complete the fabrication of the product.

The standard in-mold decorating technique possessed a variety of drawbacks to its use, particularly in high speed, continuous molding manufacturing situations. For example, the hot transfer bearing the decorating indicia had to exceed the indicia in size, with the result that the quantities of plastic film utilized per decoration were unnecessarily great. Also, the disposition of additional plastic film on the final product detracted from its appearance.

Efforts to remove excess plastic film from the decoration could only be directed to post-molding operations, as precutting or punching of the continuous strip would result in the failure during the molding process due to mal-alignment of the decoration with the molded product. Likewise, attempts to remove excess film from the molded product frequently result in tearing or other fracturing of the remaining indicia, or damage to the product itself, so that a high rate of rejects would develop.

The prior art with respect to in-mold decorating, is exemplified by U.S. Pat. Nos. 4,059,471 to Haigh, and 4,202,663 to Haigh, deceased etal. These patents speak in passing of in-mold decoration, but concern themselves primarily with the transfer of a dye from a transfer sheet, through a polyolefin film, to a thermoplastic sheet. This is accomplished by the application of heat and pressure, causing the dye to sublime through the film and into the plastic sheet.

Similarly, the U.S. Pat. No. 3,292,209 to Borkmann, and U.S. Pat. No. 3,816,207 to Robertson et al, illustrate variant apparatus utilized for the practice of transfer decoration. Borkmann is noted for its effort to develop an apparatus to practice a method disclosed in U.S. Pat. No. 3,108,580 to Brandt, wherein labels are indexed into position and a blow-molded parison, in the semi-molten state is then inflated thereagainst and heat fused thereto. Borkmann illustrates by its complexity the intricate and critical apparatus that must be utilized in accordance with the prior art, to assure alignment of the decoration with the product being molded.

The criticality and complexity of in-mold decorating techniques, as discussed above, has militated against their use in the preparation of complex decorations, of the type that are now of interest to the packaging field. For example, complex decorations are now desirable for product decoration, that may include as many as three or four divergent indicia, including photographic fascimiles of a broad range of colors, appropriately trimmed with a metalized layer. The preparation of this type of complex, compound decoration requires the use of techniques such as multiple-stage printing by screen printing techniques and the like, all of which is time consuming an expensive due to the criticality in the alignment of the images of the respective components of the decoration.

During the course of the development of the present invention, the inventors investigated the use of pre-cutting the hot transfer stock, and determined that such pre-cutting would further complicate any efforts to utilize the film for continuous in-mold decoration. In particular, the precutting of the stock, either in whole or in part, resulted in failure, as the decorated portions of the stock would dislodge and could not be retained in alignment, particularly at the commercial speeds of operation, of in-mold decorating procedures. Further investigations revealed that the area of die-cutting of transfer items was well known, but was limited in its application to pressure sensitive labels. Representative prior art patents on die-cutting, comprise U.S. Pat. No. 2,391,539 to Avery, and U.S. Pat. No. 3,166,186 to Karn. Both patents deal primarily with pressure-adhesive label stock, that is disposed on a peel-away base, and is appropriately diecut by perforations or full cutting, so that the labels may be easily removed from the base for application to the intended substrate, without preliminarily adhering to themselves or to other objects before use.

Efforts to apply die-cutting techniques to plastics generally have met with failure. Particularly in the instance where the plastic films are measured in thicknesses of 3 to 10 mils, the tolerance of most die-cutting equipment is such that one cannot guarantee that the cutting edge will strike through the first film and into the second or carrier film, and it is this strike-through that would result in the same difficulty that one would experience if a single film were die-cut by perforation or otherwise. Clearly, then, the die-cutting techniques familiar to the label making art were investigated, and initially found to be unable to meet the rigid tolerances and requirements of the hot transfer industry.

A need therefore exists for the development of a hot transfer decorated film, that will permit its individual application to a product by a continuous, rather than individual, in-mold decorating technique without the need for complex decoration preparation, and post-treatment of the decorated product.

SUMMARY OF THE INVENTION

In accordance with the present invention, a method for preparing a die-cut hot transfer film useful in continuous inmold decoration has been developed. The method comprises forming a laminate of a carrier film useful in hot-transfer decorating processes, and a thermoplastic resinous transfer film, which is to serve as the substrate for the decoration. Lamination may be conducted under heat and pressure.

The decorating indicia are then printed on the laminate, on at least a portion of the free surface of the transfer film. The indicia may be applied in a single printing step, or in multiple steps in the instance of compound or complex indicia, and may be placed in regularly spaced-apart disposition. A plurality of indentical indicia may thus be disposed on an elongated strip of the laminate. The printing step may include the initial application of colored indicia in the same register, followed by an over-plating or application of metalized dress.

After the application of decorating indicia is complete, the decorated laminate is die-cut in a controlled manner, so that the die fully penetrates the thickness of the transfer film without penetrating the surface of the carrier film.

After die cutting is complete, the unwanted portion of the transfer film is stripped away, leaving the decorated portions of the transfer film situated on the continuous carrier film, which may be then be fed into an appropriate product molding chamber, and into alignment therein for accurate hot-transfer to a plastic article during the molding thereof. Thereafter, the carrier film may be reused.

Preferably, the carrier film may be of any thickness, and may comprise thermoplastic materials useful in hot-transfer processes, such a polyesters, polycarbonates, and cellulose derivates. The film may be transparent or translucent and may be 0.5 mil in thickness or greater, depending upon the product to which the transfer is to be applied. Suitable thermoplastic resins comprise vinyl polymers, such as polyvinylchloride, modified polyurethanes, acrylic polymers, and polyolefins, such as polyethylene, polypropylene and polystryene homo- and copolymers.

Lamination of the carrier film and the transfer film may take place at speeds of up to 200 feet per minute by passage of the two films through the nip of heated rollers. The resulting laminate may then be printed, either by a single or a multiple printing sequence, the latter in the instance where a plurality of colors or color combinations are desired. At the same time, indexing marks may be disposed on the transfer film, to assure alignment for the later die-cutting operation.

In the instance where multiple colors are applied, followed by a metalized dress, it is preferable to apply a sizing coat after the metalized dress. Sizing coats may be selected from a variety of compositions, including polyurethanes, polyolefins, acrylic and vinyl polymers. In such instance, it is desirable the sizing coat be applied to the entirety of the surface of the transfer film.

Die-cutting is accomplished by indexing the decorated laminate into appropriate position, with the aid of the indexing marks applied during the printing step. Die hardnesses, bevels and temperatures are carefully controlled to assure that the cutting edge penetrates fully through the transfer film, but does not penetrate the surface of the carrier film. Among the parameters mentioned is the use of a heated die with beveled cutting edges, that operates against a chilled anvil. A critical aspect of the diecutting sequence, is the need to continually remove the unwanted portions of the film, known as the "skeleton" both from the carrier film and from any interstices of the die, in which portions of the "skeleton" may have lodged. Preferably, the "skeleton" is removed from the laminate by passage thereof through idler rolls and take up of the skeleton thereat.

The resulting product is then continually indexed into position within appropriate molds, to complete the in-mold decorating technique. In-mold decoration, per se is conducted in accordance with known techniques.

The product emerging from the mold, has placed in perfect alignment thereon, the desired decoration. There is no need for post-treatment of the product, such as trimming etc. of the decoration to remove excess portions of the hot transfer. The resulting decoration possesses improved appearance as it is in greater integration with the molded article.

The in-mold decorating operation may be run continuously and at commercially desirable speeds, thereby rendering such techniques economically attractive. The decorated hot-transfer prepared in accorance with the present invention is likewise economical, as it can be prepared with relatively simple equipment and with a reduced number of operations. Thus, the complex printing sequences utilized in the prior art may be reduced and intricate decorations may be applied with one or two sequential printing applications.

Accordingly, it is a principal object of the present invention to provide a method for the preparation of decorated hot-transfer materials for application in continuous inmold decorating operations.

It is a further object of the present invention to provide the method as aforesaid, wherein the deocrated hot-transfer materials may be prepared from relatively thin layered plastic materials that are die-cut prior to being hot tranferred.

It is a still further object of the present invention to provide a method as aforesaid that is of simple and economical operation.

It is a still further object of the present invention to provide a method as aforesaid that eliminates costly, time consuming post-treatment of the decorated, molded plastic articles.

Other objects and advantages will become apparent to those skilled in the art from a review of the ensuing description which proceeds with reference to the following illustrative drawings.

DETAILED DESCRIPTION

Figure 1:
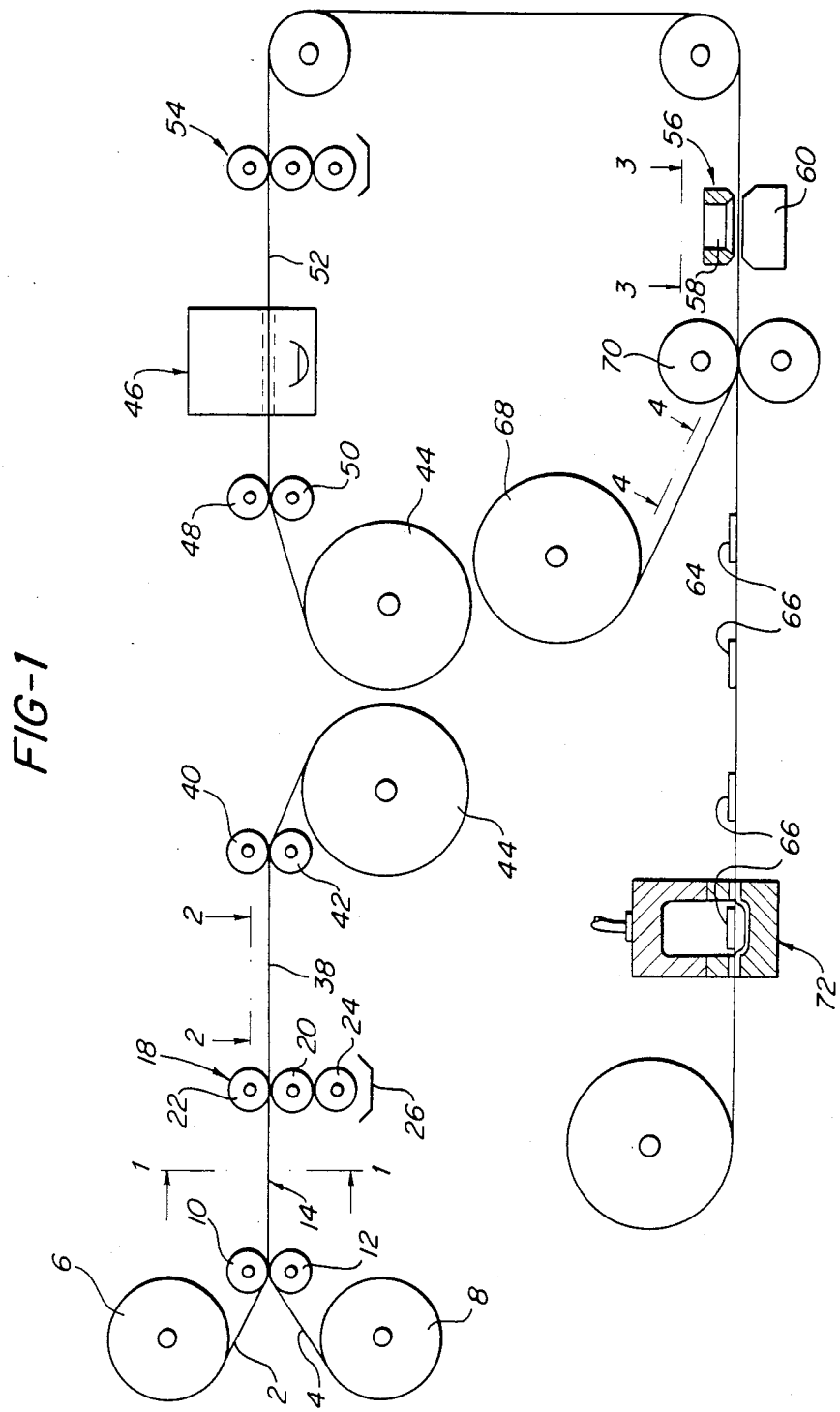
FIG. 1 is a schematic plan view sequentially illustrating the steps of the present method.

In its broadest aspect, the method of the present invention comprises the preparation of a releasable laminate of a carrier film and a thermoplastic resinous transfer film, the transfer film to serve as the outer surface of a decoration to be hot-transferred to a plastic article during the molding thereof. The formed laminate is provided with printed indicia on the exposed surface of the transfer film, after which it is die-cut to isolate the decorated portions of the transfer film from those unwanted portions of the transfer film, known as the "skeleton". The skeleton is thereafter peeled away, leaving the decorated portions of the transfer film adhesively bound to the carrier film, which is then indexed into alignment within the mold for the plastic articles, so that continuous in-mold decoration of the formed plastic articles may take place by a hot-transfer technique.

The carrier films useful in accordance with the present method, comprise those films capable of withstanding repeated use in hot-transfer processes. Thus, the carrier should be capable of successive laminations to the transfer film under heat and pressure, followed by stripping of portions of the transfer film, and subsequent exposure to in-mold hot-transfer of the remaining transfer film to the article to be decorated. Additionally, the carrier film should be capable of undergoing repeated exposure to various printing techniques, including vacuum metalization. Suitable materials include films prepared from the materials selected from the group consisting of amorphous and oriented polyester resins, polycarbonate resins, cellulosic derivatives, including cellulose esters and ethers and their copolymers. In particular, the polyesters may include polyethylene terephthalate; polycarbonates may include acrylonitrile-butadiene-styrene resins; and the cellulosic derivates include cellulose acetate, cellulose acetate butyrate, ethyl cellulose and viscose, known as "cellophane". The carrier film may vary in thickness from about 0.5 mil upwards, and preferably, from about 3 mil upwards. A range of 0.5 mil to about 7 mil is exemplary. The exact thickness of the carrier film will vary with the processing of the transfer film, and the specific molding technique and article for which decoration is intended.

The transfer film comprises a thermoplastic resinous material, selected from the group consisting of vinyl resins, modified polyurethane resins, acrylic homo- and copolymers, polyolefin resins, including substituted and unsubstituted resins, and the like. More specifically, the vinyl resins include polyvinylchloride, polyvinylacetate, polyvinyl alcohol and copolymers thereof; the acrylic polymers include polyacrylates, such as polymethylmethacrylate; polyolefins include polyethylene, polypropylene, polystyrene and the like; and polyurethanes include Bisphenol A-epichlorohydrin derivatives, and the like. The transfer film is preferably transparent, but may be translucent and provided with appropriate coloration, to achieve different visual effects. The transfer film may vary in thickness, from 0.5 mil upward, in similar fashion to the carrier film, depending upon the plastic article to which the transfer film is to be adhered. A thickness ranging from 1 to 3 mils is exemplary.

Figure 2:
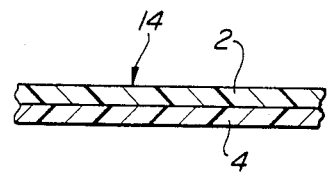
FIG. 2 is a sectional view taken through Line 1—1 of FIG. 1, showing the initial laminate formed by the present invention.

Lamination of the transfer film to the carrier film may be conducted by simple heat and pressure. Thus, for example, and referring now to FIG. 1, the carrier film 2 and the transfer film 4 may be payed out from respective reels 6 and 8 and brought together between the nip of pressure rollers 10, 12 to form the laminate 14 illustrated sectionally in FIGS. 2 and 3. Referring now to FIG. 2, the laminate may be formed by the application of heat and pressure at the nip of rollers 10,12, to achieve a releasable surface bound between carrier film 2 and transfer film 4. For example, rollers 10,12 may be heated to a temperature ranging from about 180° to about 350° F., and may impose a pressure upon carrier film 2 and transfer film 4 of between 40 psi and 100 psi. The temperature would be instantaneously applied at pressure rollers 10,12 and the respective films 2 and 4 would pass between the nip of the rollers at speeds of up to about 200 feet per minute on a commercial scale. The laminate 14 formed by the application of heat and pressure is illustrated in FIG. 2.

Figure 3:
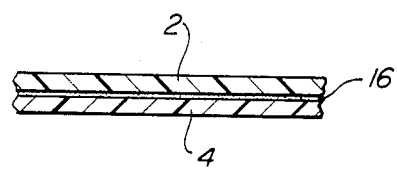
FIG. 3 is a sectional view similar to FIG. 2 showing a variant laminate in accordance with the present invention.

Referring now to FIG. 3, an alternate laminate 14 is shown. In this instance, the carrier film 2 has been provided with a suitable room temperature, releasable adhesive coating, labeled 16, that would retain carrier film 2 and transfer film 4 in contact with each other throughout the following processing, but would release upon either the exertion of mechanical tension, by the stripping of the "skeleton", discussed hereinafter, or by the application of the heat generated by the in-mold hot transfer processing. Suitable materials to serve as the releasable adhesive would include certain thermoplastic monomers and polymers, including cellulose esters and ethers and vinyl compounds. For example, nitrocellulose may be utilized as the adhesive release coating. The coating may be applied in a thickness of less than one mil, and would be disposed as shown in FIG. 3.

In a preferred embodiment of the invention, the laminate 14 may comprise a combination of an approximately 2 mil thick polyester carrier film, to which a roughly 1 mil thickness transfer film has been "piggy backed". Naturally, the foregoing thicknesses are illustrative only, and are not intended to limit the present invention.

Figure 4:
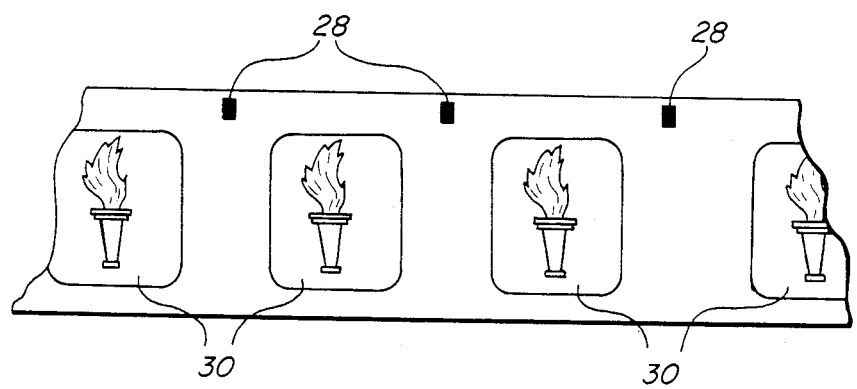
FIG. 4 is a top plan view in the area defined by Line 2—2 illustrating the placement of indexing marks in accordance with the present invention.

After its formation, the laminate 14 may then be appropriately printed with the desired decorating indicia. Referring to FIG. 1, a typical printing station 18 is illustrated, which may comprise a printing roller 20 cooperating with a idler roll 22 and an ink supply roller 24 transferring a thin film of ink from a reservoir 26. Printing roller 20 would have appropriately disposed thereon the pattern of the desired indicia, so that the desired decoration is disposed on the free surface of transfer film 4. A variety of printing apparatus and techniques may be utilized, all known in the art, and printing station 18 is therefore merely illustrative of an apparatus and associated emthod that may be utilized to place indicia on transfer film 4. Referring briefly to FIG. 4, the present method contemplates the die-cutting and resulting pre-trimming of the individual decorated portions of transfer film 4. To assist in the accurate operation of the die-cutting step, appropriate indexing indicia or indexing marks 28 may be printed upon the transfer film 4 during the printing operation. Thus, as shown in FIG. 4, an indexing mark 28 is disposed in regularly spaced disposition with respect to decorating indicia 30 as shown.

Referring further to FIG. 4 momentarily, it can be seen that the decorating indicia may be regularly spaced with respect to each other as well as with respect to decorating indicia 30, to permit the sequential indexing into the mold of the laminate 14, thereby assuring alignment and accurate transfer of indicia 30 during the molding sequence.

The accuracy of transfer, as well as that of the formed decoration, is a function of the positioning of the die during the die-cutting operation described hereinafter. The importance of the indexing mark 28 can thus be appreciated.

Figure 5:
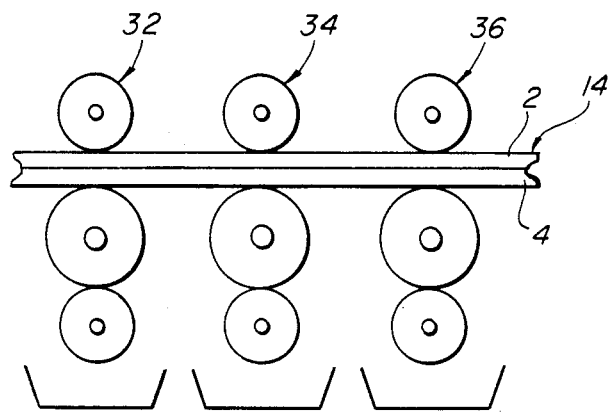
FIG. 5 is an enlarged schematic sectional view similar to the region defined by Line 2—2 in FIG. 1, showing a multiple printing station in accordance with an embodiment of the present invention.

Referring now to FIG. 5, an alternate printing station is shown, to facilitate the application of sequential, divergent colors, patterns, etc., to form a composite decoration. As illustrated, regularly spaced printing stations 32, 34 and 36 are disposed to receive laminate 14. Printing stations 32, 34 and 36 carry individual patterns, and/or colors so that color or pattern blends may be applied in overlying fashion to blend or complement each other. The printing inks, etc. applied to surface of transfer film 4 may be of the variety that dry on contact, so as to avoid "bleeding" of the various colors between adjacent printing stations, in the instance where printing rollers are utilized. As printing may be applied by means other than pressured application, such as jet printing, screen printing etc., "bleeding" may pose no problem.

One of the aspects of multiple color printing, is that, in accordance with the present invention, a technique known as "reverse printing" must be utilized. That is, in the instance where a substrate is printed with a multiple color decoration, the sequence of color application is such that the last-applied color is that which forms the uppermost portion of the decoration. In the instance where, however, the decoration is applied to the underside of a film, this order must be reversed, so that "reverse printing" must be utilized. Accordingly, printing station 32 as illustrated would apply the uppermost color and indicia, with printing stations 34 and 36 respectively applying intermediate and base colors and indicia in overlying relationship to each other. In this way, when the composite decoration is applied to the surface or substrate of the plastic article, the respective layers of printing or color will be appropriately positioned.

Referring further to FIG. 1, the printing operation frequently includes the disposition of a metalized coating as a "base" portion of the decoration. Thus, the decoration may include a border and lettering. Frequently, one or more colors are applied by the techniques described above, with appropriate areas left unprinted, to account for the later application of a metalized layer, to define either or both the border of the decoration and the lettering thereon. Naturally, selective printing of colors may vary to suit the specific effect desired in the decoration, so that the invention is not limited to the disposition of the metalized effect in any specific position. The foregoing is therefore illustrative only.

Referring again to FIG. 1, in the instance where a metalized coating is to be applied, the printed laminate 38 is passed through appropriate idler rolls 40, 42 and wound up on a take up roll 44. Thereafter, take up roll 44 is payed out and passes through an appropriate metalizing station 46, illustrated schematically herein, so that the surface of laminate 38 having printing already thereon, is disposed in position to receive the metalized coating. Idler rolls 48 and 50 are illustrated but are optional.

Metalization may be accomplished by conventional techniques, such as vapor deposition. The present invention does not relate to the specific manner in which metalization is accomplished, and therefore the techniques of vapor deposition of metal as known in the art, may be utilized herein, and such techniques are incorporated herein by reference.

As known in the art, a number of metals may be applied by vapor deposition to form a tightly adherent, continuous coating. Such metals would include both precious nonprecious metals, such as gold, silver, tin, zinc, chromium and aluminum. For example, aluminum may be and is conventionally applied, by deposition to a thickness that may range, for example, up to about 400 Angstroms. The exact thickness of the layer is discretionary and may accordingly vary. In similar fashion, the previous description with regard to printing, contemplates a variation in the thickness of the respective color coatings, with thicknesses on the order of 1 or 2 mils standard.

In the instance where a metalized coating is applied, it is advisable to likewise apply a sizing coating before the resulting laminate 52 is die-cut. Referring again to FIG. 1, the sizing coat may be applied by coating roller station 54, to a thickness that may likewise vary to a few microns. The sizing compositions useful in accordance with the present invention, include vinyl polymers, acrylic polymers, polyolefins such as polyethylene, and polyurethanes. The sizing coat is applied to assure the integrity of the metalized coating, through the die-cutting technique, to thereby prevent edge fracture during the die-cut. In the further event that the sizing coat as applied, reduces adhesion of the ultimate decoration, a wash of tie coat of a material such as chlorinated rubber may be applied in a thickness of less than one mil. The application of the wash coat, however, is purely optional, and depends upon the conditions and applications to which the decorated heat transfer material is exposed during the in-mold transfer process.

Figure 6:
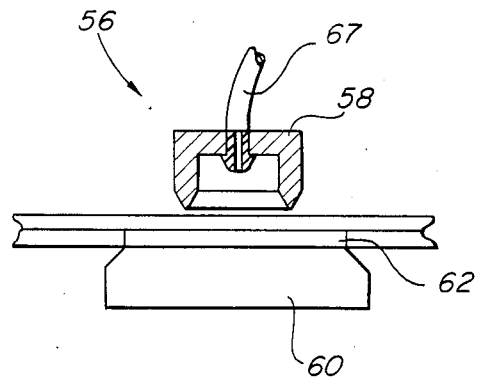
FIG. 6 is an enlarged schematic view taken in the area defined by Line 3—3 of FIG. 1 showing a representative die-cutting station in accordance with the present invention.

Referring now to FIGS. 1 and 6, after the coating of transfer film 4 is completed in any of the variations described above, the resulting decorated laminate is indexed into position for die-cutting. An appropriate die-cutting station 56 is shown, comprising cutting edge 58 adapted to impact transfer film 4, and anvil 60 located adjacent the free surface of carrier film 2. Upon the positioning of the laminate within station 56, cutting edge 58 and anvil 60 are brought together, conventionally by the movement of cutting edge 58, to cause an incision to be formed that passes through the entire thickness of transfer film 4, taking care not to penetrate the underlying adjacent surface of carrier film 2.

As mentioned earlier, the exact construction and operation of die-cutting station 56 is critical to the accomplishment of the die-cutting operation. In specific, the die-cutting station 56 as shown in FIG. 6, may comprise, in addition to cutting edge 58 and anvil 60, bearing surfaces 62, which serve to limit the motion of cutting edge 58, to assure that the travel of cutting edges 58 is stopped short of penetration of carrier film 2. The provision of carrier film 2 in the sizes mentioned earlier, requires that the bearing surfaces 62 must be prepared to exacting tolerances, and from materials of critical hardness, to assure dimensional stability in operation.

In similar fashion, cutting edges 58 must be of critical hardness to assure sharpness and dimensional stability during high speed, commercial operation, so that complete penetration of transfer film 4 without penetration of carrier film 2, is uniformly achieved. Thus, for example, cutting edges 58 may be appropriately beveled at acute angles, and may be provided with hardened outer surfaces, by chrome plating, etc. to assure dimensional stability and uniformity of resulting operation.

Other features of the die-cutting stations 56, illustrated in FIG. 6, include an ejector means 67, disposed adjacent cutting edges 58, to assure that any unwanted portions of transfer film 4 that might be retained by cutting edges 58 after the cutting operation, are appropriately removed to avoid clogging and breakdown of die-cutting station 56. This would be appropriate, in the instance where the final transfer material assumes a doughnut shape, and, correspondingly that a central portion of the transfer film 4 must be individually removed. Ejection may be accomplished by air pressure, vacuum, or mechanical means, not shown. The choice of specific ejection means is not critical to the present invention, and may vary within the scope thereof.

Figure 7:
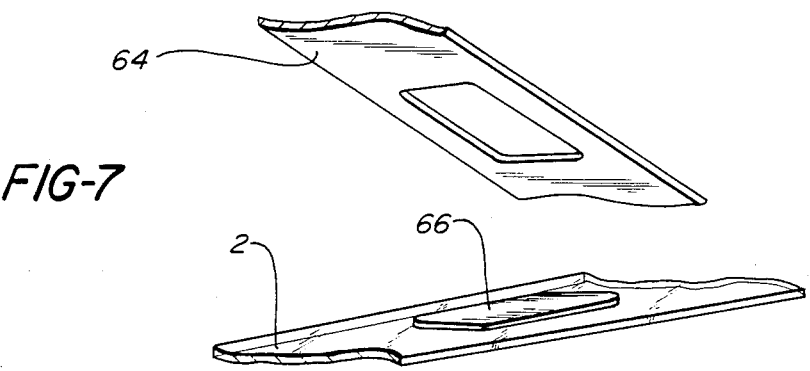
FIG. 7 is a perspective taken in the area defined by Line 4—4 of FIG. 1, showing the skeleton and resulting laminate at the point of their separation from each other.

Upon completion of the die-cutting operation, the resulting decorated transfer material is not separated from the unwanted portion of transfer film 4, known as the skeleton Referring now to FIG. 7, the removal of the skeleton 64, leaving carrier film 2 bearing complete decorated transfer material 66, is illustrated in perspective. Skeleton 64 may be drawn off to an appropriate take off reel 68, as shown schematically in FIG. 1, as the die-cut laminate passes an appropriate idler roll 70. Thus, the die-cut transfer material 66 is retained in position along carrier film 2, which may then be introduced into an appropriate mold assembly labeled 72 and shown schematically in FIG. 1, wherein the in-mold transfer to a plastic article simultaneously formed, may take place.

The technique of in-mold decorating is known in the art, and reference made to U.S. Pat. Nos. 4,202,663 and 4,059,471, respectively, to the selected portions thereof, dealing with in-mold decoration. The present in-mold decorating process is distinguishable, in that the entire decorated transfer material 66 is permanently bonded to the adjacent surface of the formed article, when the mold is closed, and appropriate heat and pressure are applied. The in-mold decoration techniques utilized in accordance with the present invention, may vary depending upon the plastic articles and their method of manufacture. Thus, for example, as illustrated in the aforementioned U.S. Pat. Nos. 4,202,663 and 4,059,471, the plastic articles may comprise sheets, blocks or the like that are hot stamped into final shape, or appropriate parisons that are placed in a mold cavity and thereafter blown to form hollow articles. In each instance, the carrier film bearing the decorated transfer material may be indexed into the mold cavity, with the printed indicia positioned to lie adjacent the outer surface of the molded plastic article, whereupon the plastic article and the transfer material and the adjacent surface of the article are forced into pressured contact with each other, at an elevated temperature sufficient to effect a permanent bond therebetween. An apparatus suitable for the performance of in-mold decorating, is also disclosed in U.S. Pat. No. 3,292,209 to Borkmann, and the disclosure thereof is accordingly incorporated herein by reference as illustrative of any in-mold decorating technique and associated apparatus useful in accordance with the present invention.

It can therefore be seen that the advantage of the present invention is that a continuous strip of pre-cut decorated heat transfers may be prepared so as to easily index into alignment for application to a plastic article, to facilitate hot transfer to plastic articles in accordance with in-mold decorating techniques, on a continuous basis. As the present method facilitates the exact positioning of the decorated transfers upon the carrier film, multiple coatings are easily and inexpensively performed, and post-treatment of the decorated plastic articles is eliminated.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A method for the continuous in-mold decoration of plastic articles during their mold formation, consisting essentially of:
   A. forming a laminate from an organic resinous carrier film used in hot-transfer decorating processes having a thickness ranging from 0.5 mil to 7 mil, and a printable thermoplastic transfer film used in hot-transfer decorating processes, said transfer film having a thickness ranging from 0.5 mil to 3 mil;
   B. printing at least one decorating indicia on said laminate, on at least a portion of the free surface of said thermoplastic transfer film;
   C. forming a plurality of decorated hot-transfer materials by die-cutting said thermoplastic transfer film in a controlled manner to fully penetrate the thickness of said thermoplastic transfer film without penetrating the adjacent surface of said carrier film;
   D. separating the unwanted portions of said thermoplastic transfer film from said carrier film, so that said hot transfer materials remain releaseably bound to said carrier film;
   E. continuously indexing said carrier film into a mold adapted for said in-mold decoration, and applying consecutive of said hot transfer materials to consecutive of said plastic articles during the molding thereof; and
   F. separating the decorated plastic articles molded in Step E from said carrier film.

2. The method of claim 1 wherein said carrier film is selected from the group consisting of polyester resins, polycarbonate resins, and cellulosic derivates.

3. The method of claim 2 wherein said carrier film is selected from the group consisting of polyethylene terephthalate, acrylonitrile-butadiene-styrene resins, cellulose acetate, cellulose acetate butyrate, ethyl cellulose and cellophane.

4. The method of claim 1 wherein said thermoplastic transfer film is selected from the group consisting of vinyl resins, modified polyurethane resins, acrylic homopolymers acrylic copolymers, and polyolefin resins.

5. The method of claim 4 wherein said thermoplastic transfer film is selected from the group consisting of polyvinylchloride, polyvinylacetate, polyvinyl alcohol, copolymers thereof; polyacrylates, polymethylmethacrylate, homopolymers and copolymers thereof; polyethylene, polypropylene, polystyrene, homopolymers and copolymers thereof; substituted polyurethanes, and unsubstituted polyurethanes.

6. The method of claim 1 wherein said thermoplastic transfer film ranges in thickness from about 1 mil to about 3 mils.

7. The method of claim 1 wherein a plurality of decorating indicia are printed on said laminate in regularly spacedapart relationship to each other.

8. The method of claim 7 wherein said laminate comprises a continuous strip and an indefinite number of identical decorating indicia are printed thereon.

9. The method of any of claims 1, 7 or 8 wherein said printing step includes the printing on said thermoplastic transfer film of at least one indexing mark, in spaced relation to said decorating indicia, to serve as a guide for the alignment of said laminate during said die-cutting step.

10. The method of claim 9 wherein a plurality of regularly spaced indexing marks are printed on said thermoplastic transfer film, in spaced relation to each other, and to said decorating indicia, so that each of said decorating indicia may be properly aligned for said die-cutting step.

11. The method of any of claim 1, 7 or 8 wherein said decorating indicia is printed in a single color and in a single printing pass.

12. The method of any of claims 1, 7 or 8 wherein said decorating indicia is printed in a plurality of different colors.

13. The method of claim 12 wherein said different colors are applied in a single printing pass.

14. The method of claim 12 wherein said different colors are applied sequentially at regularly spaced printing stations.

15. The method of claim 14 wherein said different colors are applied in reverse fashion with the color intended to appear outermost being applied first.

16. The method of claim 11 further including applying a layer of vaporized metal to at least a portion of said decorating indicia.

17. The method of claim 12 further including applying a layer of vaporized metal to at least a portion of said decorating indicia.

18. The method of claim 14 further including applying a layer of vaporized metal to at least a portion of said decorating indicia.

19. The method of claim 16 wherein, subsequent to the application of said layer of vaporized metal, a sizing coat is applied thereon.

20. The method of claim 17 wherein, subsequent to the application of said layer of vaporized metal, a sizing coat is applied thereon.

21. The method of claim 18 wherein, subsequent to the application of said layer of vaporized metal, a sizing coat is applied thereon.

22. The method of claim 19 wherein said sizing coat is selected from the group consisting of polyurethane resins, acrylic resins, vinyl resins and polyolefin resins.

23. The method of claim 20 wherein said sizing coat is selected from the group consisting of polyurethane resins, acrylic resins, vinyl resins and polyolefin resins.

24. The method of claim 21 wherein said sizing coat is selected from the group consisting of polyurethane resins, acrylic resins, vinyl resins and polyolefin resins.

25. The method of claim 1 wherein said die-cutting is performed by pressing a appropriately configured cutting die against the surface of said laminate defined by said thermoplastic transfer film, while steadying said laminate against a supporting anvil.

26. The method of claim 25, wherein said die-cutting step is performed under a temperature gradient, with heat applied to said thermoplastic transfer film through said cutting edge, while reduced temperature is applied to said carrier film through said anvil.

* * * * *